(12) United States Patent
Ozawa et al.

(10) Patent No.: US 11,932,243 B2
(45) Date of Patent: *Mar. 19, 2024

(54) VEHICLE CONTROL DEVICE AND CONTROL METHOD

(71) Applicant: TOYOTA JIDOSHA KABUSHIKI KAISHA, Toyota (JP)

(72) Inventors: Jun Ozawa, Tokyo (JP); Minami Sato, Ebina (JP); Shinichi Nagata, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,036

(22) Filed: Dec. 13, 2022

(65) Prior Publication Data
US 2023/0111893 A1 Apr. 13, 2023

Related U.S. Application Data

(63) Continuation of application No. 17/520,162, filed on Nov. 5, 2021, now Pat. No. 11,780,430, which is a
(Continued)

(30) Foreign Application Priority Data

Aug. 31, 2017 (JP) .................................. 2017-166943

(51) Int. Cl.
*G06F 19/00* (2018.01)
*B60K 31/00* (2006.01)
(Continued)

(52) U.S. Cl.
CPC ............ *B60W 30/09* (2013.01); *B60W 10/18* (2013.01); *B60W 2420/42* (2013.01); *B60W 2554/00* (2020.02); *G08G 1/166* (2013.01)

(58) Field of Classification Search
CPC .. B60W 30/09; B60W 30/15; B60W 30/0165; B60W 30/14; B60W 60/00276;
(Continued)

(56) References Cited

U.S. PATENT DOCUMENTS

| 5,710,565 | A | * | 1/1998 | Shirai | ...................... | B62D 1/28 |
| | | | | | | 342/70 |
| 6,647,353 | B2 | * | 11/2003 | Fujibayashi | ......... | G05B 19/416 |
| | | | | | | 702/150 |

(Continued)

FOREIGN PATENT DOCUMENTS

| CN | 1880920 | A | * | 12/2006 | ................ | B60T 7/22 |
| CN | 1880920 | A | | 12/2006 | | |

(Continued)

OTHER PUBLICATIONS

U.S. Appl. No. 17/520,162 filed Nov. 5, 2021 to Jun Ozawa.
(Continued)

*Primary Examiner* — Yuri Kan
(74) *Attorney, Agent, or Firm* — Sughrue Mion, PLLC

(57) ABSTRACT

A vehicle control device includes an electronic control unit configured to: enlarge the detection range, when the electronic control unit determines that a current deceleration support control is control for passing the object; set a new target deceleration of the host vehicle when a new object with a possibility of collision with the host vehicle has been detected in the enlarged detection range; determine whether an interval from an ending time of the current deceleration support control to a starting time of the next deceleration support control is less than a threshold value, when the electronic control unit determines that the next deceleration support control is control for passing the new object; and perform one of the inter-vehicle distance control and acceleration support control from the ending time to the starting
(Continued)

US 11,932,243 B2
Page 2 time, when the electronic control unit determines that the interval is less than the threshold value.

9 Claims, 8 Drawing Sheets

Related U.S. Application Data continuation of application No. 16/908,130, filed on Jun. 22, 2020, now Pat. No. 11,485,356, which is a continuation of application No. 16/055,638, filed on Aug. 6, 2018, now Pat. No. 10,723,349.

(51) Int. Cl.
*B60Q 1/00* (2006.01)
*B60Q 1/08* (2006.01)
*B60Q 1/12* (2006.01)
*B60T 13/58* (2006.01)
*B60W 10/18* (2012.01)
*B60W 30/09* (2012.01)
*G08G 1/16* (2006.01)

(58) Field of Classification Search
CPC .......... B60W 30/165; G05D 1/00; G01S 1/00; G01S 13/93; B60Q 1/08; B60Q 1/12; B60Q 1/00; B60T 8/172; B60T 13/58; B60T 7/22; G06F 19/00; G05B 19/416; B60K 31/00
See application file for complete search history.

(56) References Cited

U.S. PATENT DOCUMENTS

| | | | | |
|---|---|---|---|---|
| 10,723,349 | B2* | 7/2020 | Ozawa | B60W 30/16 |
| 11,014,553 | B2* | 5/2021 | Ozawa | B60W 60/00276 |
| 11,485,356 | B2* | 11/2022 | Ozawa | B60W 10/06 |
| 2002/0057195 | A1* | 5/2002 | Yamamura | G01S 13/867 340/435 |
| 2006/0289216 | A1 | 12/2006 | Kato | |
| 2010/0036565 | A1* | 2/2010 | Bernzen | B60R 21/013 701/45 |
| 2012/0065863 | A1* | 3/2012 | Takagi | B60K 31/047 701/96 |
| 2012/0200147 | A1* | 8/2012 | Endo | B60T 8/38 303/3 |
| 2012/0203438 | A1* | 8/2012 | Breuer | B60T 7/22 701/70 |
| 2013/0257140 | A1* | 10/2013 | Ogiwara | B60T 8/4872 303/3 |
| 2015/0003087 | A1* | 1/2015 | Futamura | B60Q 1/143 362/466 |
| 2015/0028742 | A1* | 1/2015 | Imaeda | B60Q 1/143 315/82 |
| 2015/0048968 | A1* | 2/2015 | Uyama | G01S 13/931 342/109 |
| 2015/0210279 | A1 | 7/2015 | Agnew et al. | |
| 2016/0231130 | A1 | 8/2016 | Akiyama | |
| 2017/0242435 | A1* | 8/2017 | Nilsson | B60W 30/16 |
| 2019/0061743 | A1 | 2/2019 | Ozawa et al. | |
| 2019/0061744 | A1* | 2/2019 | Ozawa | B60W 30/14 |
| 2019/0353243 | A1* | 11/2019 | Yamada | B60W 10/026 |
| 2020/0156607 | A1* | 5/2020 | Ueno | B60W 30/02 |
| 2020/0317191 | A1 | 10/2020 | Ozawa | |
| 2021/0253094 | A1* | 8/2021 | Ozawa | B60W 60/00276 |
| 2022/0055617 | A1* | 2/2022 | Ozawa | B60W 30/09 |

FOREIGN PATENT DOCUMENTS

| | | | | |
|---|---|---|---|---|
| JP | 8-132919 A | | 5/1996 | |
| JP | H08132919 A | * | 5/1996 | ............ B60K 31/00 |
| JP | 2005-22437 A | | 1/2005 | |
| JP | 2005022437 A | * | 1/2005 | ............ B60K 31/00 |
| JP | 2015-077936 A | | 4/2015 | |
| JP | 2015-155295 A | | 8/2015 | |

OTHER PUBLICATIONS

Notice of Allowance dated Apr. 22, 2022, which issued during the prosecution of the U.S. Appl. No. 16/908,130.
Notice of Allowance dated Aug. 1, 2022, which issued during the prosecution of the U.S. Appl. No. 16/908,130.
Notice of Allowance dated Mar. 23, 2020, which issued during the prosecution of U.S. Appl. No. 16/055,638.
Office Action issued to U.S. Appl. No. 16/908,130 dated Jan. 11, 2022.
Ozawa, Jun et al., U.S. Appl. No. 16/055,638, filed Aug. 6, 2018.
Ozawa, Jun et al., U.S. Appl. No. 16/908,130, filed Jun. 22, 2020.
U.S. Appl. No. 16/050,721, filed Jul. 31, 2018 to Jun Ozawa.
Office Action dated Apr. 5, 2023 issued in U.S. Appl. No. 17/520,162.
Notice of Allowance dated Jul. 17, 2023 to U.S. Appl. No. 17/520,162.

\* cited by examiner

VEHICLE CONTROL DEVICE AND CONTROL METHOD

INCORPORATION BY REFERENCE

This application is a continuation of U.S. patent application Ser. No. 17/520,162 filed Nov. 5, 2021, which is a continuation of U.S. patent application Ser. No. 16/908,130 filed Jun. 22, 2020, (now U.S. Pat. No. 11,485,356 issued Nov. 1, 2022) which is a continuation of U.S. patent application Ser. No. 16/055,638, filed Aug. 6, 2018 (now U.S. Pat. No. 10,723,349 issued Jul. 28, 2020), which claims priority based on Japanese Patent Application No. 2017-166943, filed on Aug. 31, 2017. The entire disclosures of the prior applications are considered part of the disclosure of the accompanying continuation application, and are hereby incorporated by reference.

BACKGROUND

1. Technical Field

The disclosure relates to a vehicle control device and a control method and more particularly to a vehicle control device and a control method which reduce collision with an obstacle.

2. Description of Related Art

Japanese Unexamined Patent Application Publication No. 2015-155295 (JP 2015-155295 A) discloses a vehicle control device that performs vehicle speed control when a vehicle passes a pedestrian. The vehicle control device identifies a pedestrian near the vehicle using an onboard sensor. The vehicle control device calculates a probability of collision with the identified pedestrian and compares the calculated probability with a threshold value. When the probability of collision is higher than the threshold value, the vehicle control device sets a separation distance from the identified pedestrian in a current traveling lane. The vehicle control device determines whether a traveling speed of the vehicle is higher than an upper-limit speed at which the set separation distance can be used. The vehicle speed control is control for generating a braking force in the vehicle before passing the identified pedestrian and decelerating the vehicle to a target speed when the traveling speed of the vehicle is higher than the upper-limit speed. According to this vehicle speed control, it is possible to avoid collision with the identified pedestrian and to safely pass the pedestrian.

SUMMARY

JP 2015-155295 A mentions that the vehicle returns to the traveling speed before passing the identified pedestrian after passing has been completed. Although details thereof are not mentioned in JP 2015-155295 A, it is generally necessary to accelerate the vehicle in order to return to the traveling speed before passing. In order to accelerate the vehicle, it is assumed that it is necessary to decrease a braking force applied to the vehicle for deceleration and to generate a driving force in the vehicle or to increase a driving force already applied to the vehicle. Such automatic vehicle speed control in which an action of the braking force for a decelerating operation and an action of the driving force for an accelerating operation thereafter are combined is also repeatedly performed after the vehicle has returned to the traveling speed before passing.

Here, there is a problem in that the vehicle control device may not identify a new pedestrian who will be passed by the vehicle during execution of automatic vehicle speed control. This is because a range in which the vehicle controller can identify a pedestrian which will be passed is normally set to be constant. In this case, there is a possibility that an accelerating operation will be quickly switched to a decelerating operation when the vehicle control device barely identifies a new pedestrian during acceleration after passing the previously identified pedestrian. Alternatively, when the vehicle control device barely identifies a new pedestrian after returning to the traveling speed before passing, a decelerating operation may be started with no margin from ending of an accelerating operation. In either case, there is a likelihood that a driver will feel discomfort in an automatic vehicle speed control sequence.

There is another problem in that a driver may notice a new pedestrian during execution of automatic vehicle speed control but the vehicle control device may not identify the new pedestrian. In this case, since the vehicle control device cannot identify the new pedestrian, there is a likelihood that the driver will feel discomfort that an accelerating operation can be started after passing the previously identified pedestrian.

The disclosure provides a technique of reducing discomfort which is felt by a driver during execution of automatic vehicle speed control in a vehicle control device and a control method in which automatic vehicle speed control for avoiding collision with an obstacle with a possibility of collision with a vehicle is performed.

An exemplary aspect of the prevent disclosure is a vehicle control device. The vehicle control device is configured to execute deceleration support control during execution of inter-vehicle distance control or constant speed control. The deceleration support control is control for avoiding collision with an object with a possibility of collision with a host vehicle. The vehicle control device includes an electronic control unit configured to: set a target deceleration of the host vehicle during execution of the deceleration support control when the object has been detected in a detection range; determine whether current deceleration support control based on the target deceleration is control for passing the object; enlarge the detection range during execution of the current deceleration support control, when the electronic control unit determines that the current deceleration support control is control for passing the object; set a new target deceleration of the host vehicle during execution of next deceleration support control for avoiding collision with a new object when a new object with a possibility of collision with the host vehicle has been detected in the enlarged detection range during execution of the current deceleration support control; determine whether the next deceleration support control is control for passing the new object; determine whether an interval from an ending time of the current deceleration support control to a starting time of the next deceleration support control is less than a threshold value, when the electronic control unit determines that the next deceleration support control is control for passing the new object; and perform one of the inter-vehicle distance control and acceleration support control from the ending time to the starting time, when the electronic control unit determines that the interval is less than the threshold value. The acceleration support control is control based on a target acceleration less than a target acceleration of the host vehicle which is set when the constant speed control is restarted. An exemplary aspect of the prevent disclosure is a control method for a vehicle. The vehicle is configured to execute deceleration support control during execution of inter-vehicle distance control or constant speed control. The deceleration support control is control for avoiding collision with an object with a possibility of collision with a host vehicle. The vehicle includes an electronic control unit. The control method includes: setting, by the electronic control unit, a target deceleration of the host vehicle during execution of the deceleration support control when the object has been detected in a detection range; determining, by the electronic control unit, whether current deceleration support control based on the target deceleration is control for passing the object; enlarging, by the electronic control unit, the detection range during execution of the current deceleration support control, when the electronic control unit determines that the current deceleration support control is control for passing the object; setting, by the electronic control unit, a new target deceleration of the host vehicle during execution of next deceleration support control for avoiding collision with a new object, when a new object with a possibility of collision with the host vehicle has been detected in the enlarged detection range during execution of the current deceleration support control; determining, by the electronic control unit, whether the next deceleration support control is control for passing the new object; determining, by the electronic control unit, whether an interval from an ending time of the current deceleration support control to a starting time of the next deceleration support control is less than a threshold value, when the electronic control unit determines that the next deceleration support control is control for passing the new object; and performing, by the electronic control unit, one of the inter-vehicle distance control and acceleration support control from the ending time to the starting time when the electronic control unit determines that the interval is less than the threshold value. The acceleration support control is control based on a target acceleration less than a target acceleration of the host vehicle which is set when the constant speed control is restarted.

According to the disclosure, when it is determined that the current deceleration support control is control for passing a deceleration object, the detection range is enlarged during execution of the current deceleration support control and thus it is possible to increase an opportunity to recognizing a new deceleration object during execution of the current deceleration support control. In a case in which a new deceleration object is recognized during enlargement of the detection range, when the next deceleration support control for avoiding collision with the new deceleration object is control for passing the new deceleration object and the interval from the ending time of the current deceleration support control to the starting time of the next deceleration support control is short, acceleration control is performed. Accordingly, it is possible to reduce discomfort which is felt by a driver during a support control sequence from starting of the current deceleration support control to ending of the next deceleration support control.

The threshold value may be a value which is set based on a vehicle speed at an ending time of the current deceleration support control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
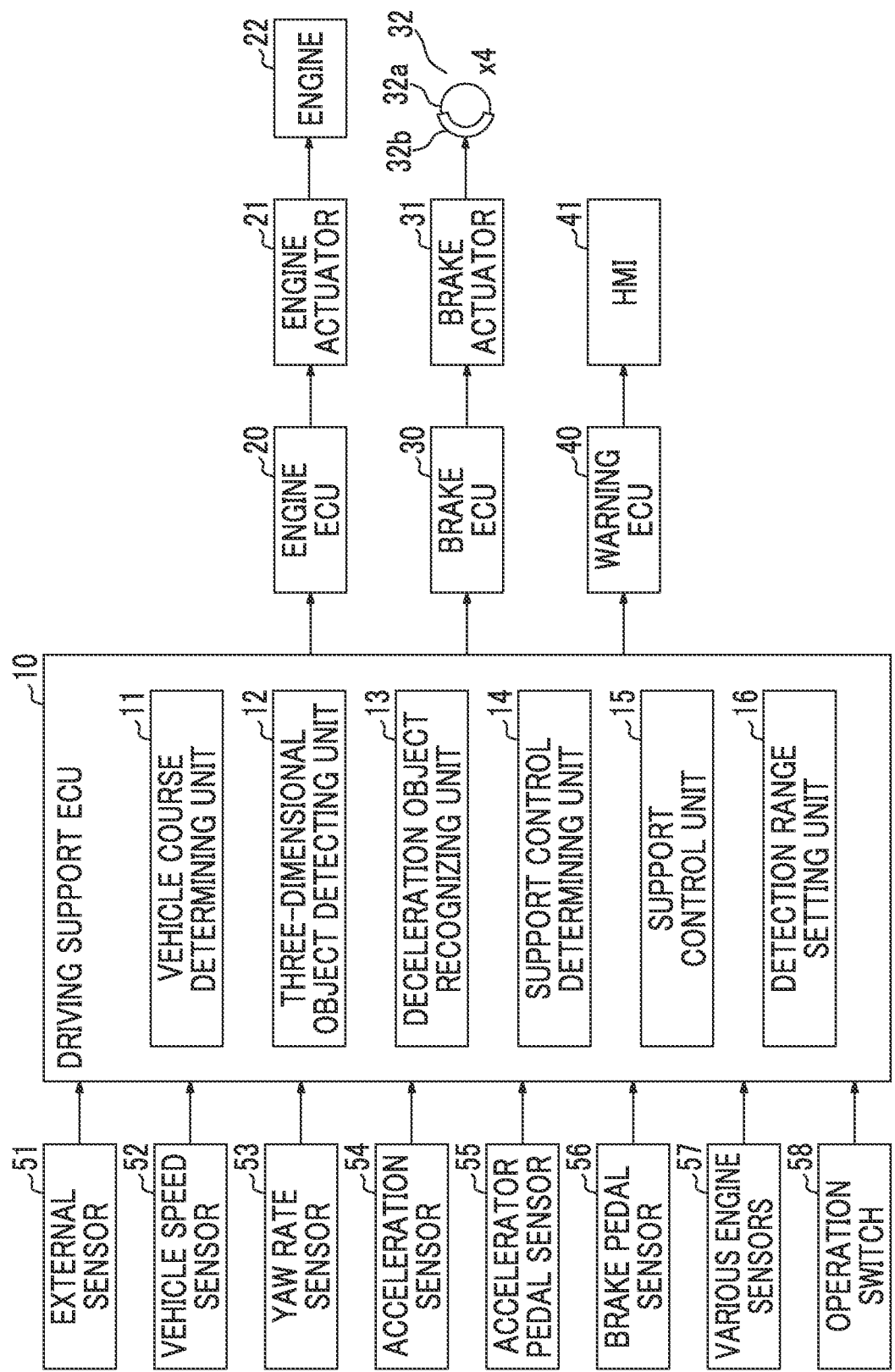
FIG. 1 is a diagram illustrating a configuration of a vehicle control device according to an embodiment of the disclosure.

Hereinafter, an embodiment of the disclosure will be described with reference to the accompanying drawings. Common elements in the drawings will be referred to by the same reference signs and description thereof will not be repeated. The disclosure is not limited by the following embodiment.

FIG. 1 is a diagram illustrating a configuration of a vehicle control device according to an embodiment of the disclosure. The vehicle control device according to this embodiment includes a driving support ECU 10, an engine ECU 20, a brake ECU 30, and a warning ECU 40. Each ECU includes a microcomputer as a major element and they are connected to each other such that the ECUs can transmit and receive information via a controller area network (CAN) which is not illustrated. ECU is an abbreviation for electric control unit. In this specification, the microcomputer includes a CPU and a storage device such as a ROM and a RAM, and the CPU embodies various functions by executing an instruction (a program) stored in the ROM. In this specification, a vehicle in which the vehicle control device is mounted is also referred to as a "host vehicle."

The driving support ECU 10 is connected to an external sensor 51, a vehicle speed sensor 52, a yaw rate sensor 53, an acceleration sensor 54, an accelerator pedal sensor 55, a brake pedal sensor 56, various engine sensors 57, and an operation switch 58. The vehicle speed sensor 52, the yaw rate sensor 53, the acceleration sensor 54, the accelerator pedal sensor 55, the brake pedal sensor 56, and various engine sensors 57 are classified as internal sensors.

The external sensor 51 has a function of acquiring at least information on a road in front of the host vehicle and a three-dimensional object near the road. Examples of a three-dimensional object include a mobile object such as a pedestrian, a bicycle, or an automobile and a stationary object such as a power pole, a tree, or a guard rail.

The external sensor 51 includes, for example, a radar sensor and a camera sensor. The radar sensor radiates, for example, radio waves of a millimeter wave band (hereinafter also referred to as "millimeter radio waves") to the surroundings (including at least the front) of the host vehicle. When a three-dimensional object that reflects the millimeter radio waves is present in a radiation range, the radar sensor calculates presence of a three-dimensional object and a relative relationship between the host vehicle and the three-dimensional object (such as a distance between the host vehicle and the three-dimensional object and a relative speed of the host vehicle with respect to the three-dimensional object) using the reflected radio waves. The camera sensor includes, for example, a stereoscopic camera. The camera sensor images a left scene and a right scene of the front of the vehicle and calculates the shape of a road, the presence of a three-dimensional object, the relative relationship between the host vehicle and the three-dimensional object, and the like based on data of the captured right and left images. The camera sensor recognizes lane markers (hereinafter also referred to as "white lines") such as outside lines of a road, a center line of a road, and a boundary line between a traveling lane and a passing lane, and calculates the shape of the road and the positional relationship between the road and the host vehicle.

Information acquired by the external sensor 51 is also referred to as "target information." The external sensor 51 repeatedly transmits the target information to the driving support ECU 10 at predetermined intervals. The external sensor 51 does not have to include the radar sensor and the camera sensor, and may include, for example, only the camera sensor. Information of a navigation system may be used as information on the shape of a road on which the host vehicle travels and information indicating the positional relationship between the road and the host vehicle.

The vehicle speed sensor 52 detects a traveling speed of the host vehicle (hereinafter also referred to as a "vehicle speed") and transmits a detection signal thereof to the driving support ECU 10. The yaw rate sensor 53 detects a yaw rate acting on the host vehicle and transmits a detection signal thereof to the driving support ECU 10. The acceleration sensor 54 detects a longitudinal acceleration which is an acceleration acting to the front and rear sides of the host vehicle and a lateral acceleration which is an acceleration acting to the right-left direction (a vehicle width direction) of the host vehicle, and transmits detection signals thereof to the driving support ECU 10. The vehicle speed sensor 52 may be a wheel speed sensor. The accelerator pedal sensor 55 detects an amount of depression of an accelerator pedal of the host vehicle and transmits a detection signal thereof to the driving support ECU 10. The brake pedal sensor 56 detects an amount of depression of a brake pedal of the host vehicle and transmits a detection signal thereof to the driving support ECU 10. The various engine sensors 57 detect an operating state quantity of a spark ignition engine which is a drive source of the host vehicle. The various engine sensors 57 include a throttle valve opening sensor, an engine rotation speed sensor, and an intake air sensor.

The operation switch 58 is a selection operator that can be used for a driver to select a control mode which is performed by the driving support ECU 10. An operating mode in which inter-vehicle distance control and constant speed control which will be described later are performed and a non-operating mode in which such control is not performed can be selected as the control mode.

The engine ECU 20 is connected to an engine actuator 21. The engine actuator 21 includes a throttle valve actuator and an actuator of a fuel injection valve or the like. When the engine actuator 21 is driven, a driving force corresponding to a torque generated from the engine 22 is transmitted to vehicle wheels. The engine ECU 20 drives the throttle valve actuator such that a degree of opening of the throttle valve matches a set target degree of opening. The engine ECU 20 determines the target degree of opening such that it increases as an amount of depression of the accelerator pedal increases at the time of normal operation.

The brake ECU 30 is connected to a brake actuator 31. The brake actuator 31 is provided in a hydraulic circuit between a master cylinder (not illustrated) that pressurizes a hydraulic oil by a depressing force on the brake pedal and frictional brake mechanisms 32 that are provided in four wheels. Each frictional brake mechanism 32 includes a brake disc 32a that is fixed to the corresponding wheel and a brake caliper 32b that is fixed to a vehicle body. The frictional brake mechanism 32 presses a brake pad against the brake disc 32a to generate a frictional braking force by operating a wheel cylinder built in the corresponding brake caliper 32b by a hydraulic pressure of the hydraulic oil supplied from the brake actuator 31.

The warning ECU 40 is connected a human-machine interface (HMI) 41. The HMI 41 includes, for example, voice output means such as a buzzer and a speaker and display means such as a head-up display (HUD), a display of a navigation system, and a combination meter. The warning ECU 40 outputs warning voice sound from the voice output means in accordance to an attention attraction command from the driving support ECU 10 or displays a warning message or a warning lamp on the display means to inform the driver of an operating state of support control.

The driving support ECU 10 will be described below. The driving support ECU 10 includes a vehicle course determining unit 11, a three-dimensional object detecting unit 12, a deceleration object recognizing unit 13, a support control determining unit 14, a support control unit 15, and a detection range setting unit 16.

The vehicle course determining unit 11 generates information on a road on which the host vehicle will travel from now on based on the target information transmitted from the external sensor 51 at each predetermined calculation cycle. For example, the vehicle course determining unit 11 generates coordinate information (position information) of a ground surface, a three-dimensional object, and white lines using a coordinate system which has a central position of the front end of the host vehicle as an origin and which is expanded to the right, left, and forward sides from the origin. Accordingly, the vehicle course determining unit 11 ascertains the shape of a traveling lane of the host vehicle which is defined by right and left white lines, a position and a direction of the host vehicle in the traveling lane, and a relative position of the three-dimensional object with respect to the host vehicle. The vehicle course determining unit 11 calculates a turning radius of the host vehicle based on the yaw rate detected by the yaw rate sensor 53 and the vehicle speed detected by the vehicle speed sensor 52, and calculates a track of the host vehicle based on the turning radius.

The three-dimensional object detecting unit 12 determines whether a three-dimensional object is a mobile object or a stationary object based on change of a position of the three-dimensional object which is present in a detection range set by the detection range setting unit 16. When the three-dimensional object is determined to be a mobile object, the three-dimensional object detecting unit 12 calculates a track of the three-dimensional object. For example, a moving speed in the longitudinal direction (the traveling direction of the host vehicle) of the three-dimensional object can be calculated from a relationship between the vehicle speed and the relative speed with respect to the three-dimensional object. A moving speed in the lateral direction of the three-dimensional object can be calculated from change of a distance between a lateral end position of the three-dimensional object and the white line detected by the external sensor 51. The three-dimensional object detecting unit 12 calculates the track of the three-dimensional object based on the moving speeds in the longitudinal direction and the lateral direction of the three-dimensional object. The three-dimensional object detecting unit 12 may calculate the track of the three-dimensional object based on the calculated track of the host vehicle and the distance between the host vehicle and the three-dimensional object detected by the external sensor 51.

The deceleration object recognizing unit 13 determines a possibility that the host vehicle will collide with the three-dimensional object (hereinafter also referred to as a "possibility of collision") when the host vehicle travels while maintaining the current traveling state based on the position of the three-dimensional object and the track of the host vehicle. When the three-dimensional object is a mobile object, the track of the three-dimensional object is calculated and the possibility of collision is determined based on the track of the three-dimensional object and the track of the host vehicle. The deceleration object recognizing unit 13 calculates a predicted collision time (TTC: Time To Collision) which is a predicted time until the host vehicle collides with the three-dimensional object (a remaining time up to collision) using Equation (1) based on the distance $L_1$ between the three-dimensional object and the host vehicle and the relative speed $Vr_1$ with respect to the three-dimensional object.

$$TTC = L_1/Vr_1 \quad (1)$$

When the predicted collision time TTC is equal to or less than a preset collision determination value $TTC_1$, the deceleration object recognizing unit 13 determines that there is a possibility of collision. When the predicted collision time TTC is greater than a preset collision determination value $TTC_2$ ($>TTC_1$), the deceleration object recognizing unit 13 determines that there is no possibility of collision. When the predicted collision time TTC is between the collision determination value $TTC_1$ and the collision determination value $TTC_2$, the deceleration object recognizing unit 13 determines that there is a low possibility of collision. When it is determined that the possibility of collision is high and it is determined that the possibility of collision is low, the deceleration object recognizing unit 13 recognizes the three-dimensional object as a deceleration object (an object). That is, the deceleration object recognizing unit 13 recognizes the three-dimensional object as a deceleration object when the predicted collision time TTC is equal to or less than the collision determination value $TTC_2$.

The support control determining unit 14 determines whether the control mode has been set by the operation switch 58. When the operating mode has been selected, the support control determining unit 14 selects one of the inter-vehicle distance control and the constant speed control depending on whether there is a preceding vehicle which travels in front of the host vehicle. The inter-vehicle distance control is control for causing the host vehicle to follow a preceding vehicle while maintaining a target inter-vehicle distance when there is a preceding vehicle. The constant speed control is control for causing the host vehicle to travel while maintain a target vehicle speed when there is no preceding vehicle.

When the support control determining unit 14 has selected the constant speed control, the support control unit 15 sets a target acceleration or a target deceleration of the host vehicle, for example, based on a preset target vehicle speed, a vehicle speed of the host vehicle, and a road surface gradient of a currently traveling lane. When the support control determining unit 14 has selected the inter-vehicle distance control, the support control unit 15 sets a target acceleration or a target deceleration of the host vehicle, for example, based on an inter-vehicle distance between the preceding vehicle and the host vehicle, a relative speed with respect to the preceding vehicle, and the road surface gradient of the currently traveling lane.

When the target acceleration in the constant speed control or the inter-vehicle distance control has been set, the support control unit 15 transmits a driving command indicating the target acceleration to the engine ECU 20. The engine ECU 20 controls the engine actuator 21 in accordance with the target acceleration such that the engine 22 is driven, and thus a driving force corresponding to an engine torque is generated to accelerate the host vehicle. When the target deceleration in the constant speed control and the inter-vehicle distance control has been set, the support control unit 15 transmits a braking command indicating the target deceleration to the brake ECU 30. The brake ECU 30 controls the brake actuator 31 in accordance with the target deceleration such that a frictional braking force is generated in the vehicle wheels. Accordingly, the automatic brake operates to decelerate the host vehicle. The inter-vehicle distance control and the constant speed control are known and thus more description thereof will not be repeated.

The support control determining unit 14 determines whether a deceleration object has been recognized by the deceleration object recognizing unit 13 in addition to determination of whether the control mode has been set. When a deceleration object has been recognized, the support control determining unit 14 sets a starting time and/or an ending time of deceleration support control for avoiding collision with the deceleration object. The starting time and/or the ending time are set to stop the host vehicle before the deceleration object when there is a high possibility of collision. That is, when there is a high possibility of collision, the support control determining unit 14 sets only the starting time.

When the operating mode has been selected, the support control determining unit 14 performs the support control determining unit 14 by interrupting the inter-vehicle distance control or the constant speed control by setting at least the starting time of the deceleration support control. When the non-operating mode has been selected, the support control determining unit 14 performs the deceleration support control by interrupting a driving operation of a driver by setting at least the starting time of the deceleration support control.

When the starting time and/or the ending time of the deceleration support control has been set, the support control unit 15 calculates a target deceleration for decelerating the host vehicle. For example, in a case in which the deceleration object stops, when the vehicle speed (=relative speed) at the current time is defined as V, the deceleration of the host vehicle is defined as a, and the time up to stopping of the host vehicle is defined as t, a traveling distance X of the host vehicle until stopping can be expressed by Equation (2).

$$X = V \cdot t + (\tfrac{1}{2}) \cdot a \cdot t^2 \quad (2)$$

The time t until the vehicle stops can be expressed by Equation (3).

$$T = -V/a \quad (3)$$

Accordingly, by substituting Equation (3) into Equation (2), the deceleration a which is required for stopping the host vehicle at the traveling distance TD can be expressed by Equation (4).

$$A = -V2/2TD \quad (4)$$

In order to stop the host vehicle a distance β before the deceleration object, the traveling distance TD can be set to a distance ($L_1$−β) obtained by subtracting the distance β from the distance $L_1$ detected by the external sensor 51. When the deceleration object is moving, the deceleration a can be calculated using the relative speed with respect to the deceleration object.

The support control unit 15 sets the calculated deceleration a as the target deceleration. Here, the deceleration which can be generated in the host vehicle is limited (for example, about −1 G). Accordingly, when the absolute value of the calculated target deceleration is greater than the absolute value of an upper limit value amax, the support control unit 15 sets the target deceleration to the upper limit value amax. The support control unit 15 transmits a braking command indicating the target deceleration to the brake ECU 30. Accordingly, the brake ECU 30 controls the brake actuator 31 in accordance with the target deceleration such that a frictional braking force is generated in the vehicle wheels. Accordingly, the automatic brake operates to decelerate the host vehicle.

The support control determining unit 14 transmits an attention attraction command to the warning ECU 40 in a step before the automatic brake operates. Accordingly, the warning ECU 40 rings the voice output means or displays a warning message or a warning lamp on the display means to inform the driver of the operating state of the deceleration support control.

The detection range setting unit 16 sets a detection range in which a deceleration object is detected. The detection range is defined by a longitudinal width and a lateral width of the front of the host vehicle along the currently traveling lane. The longitudinal width is set to, for example, a value α·V obtained by multiplying the vehicle speed V at the current time by a coefficient α. The lateral width is set to, for example, a value W·γ+ε obtained by adding a margin ε on an opposing lane side to a value W·γ acquired by multiplying the vehicle width W of the host vehicle by a coefficient γ. The coefficient α, the coefficient γ, and the margin ε are set in advance depending on a degree of safety required for the host vehicle. The coefficient α is greater than the collision determination value $TTC_2$ and the coefficient γ is greater than 1. The longitudinal width and the lateral width may be set to fixed values.

Details of the support control determining unit 14 will be described below. As described above, when a deceleration object has been recognized, the support control determining unit 14 sets the starting time and/or the ending time of the deceleration support control and performs the deceleration support control. When the constant speed control or the inter-vehicle distance control is being performed, the support control determining unit 14 interrupts the support control under execution and performs the deceleration support control.

Figure 2:
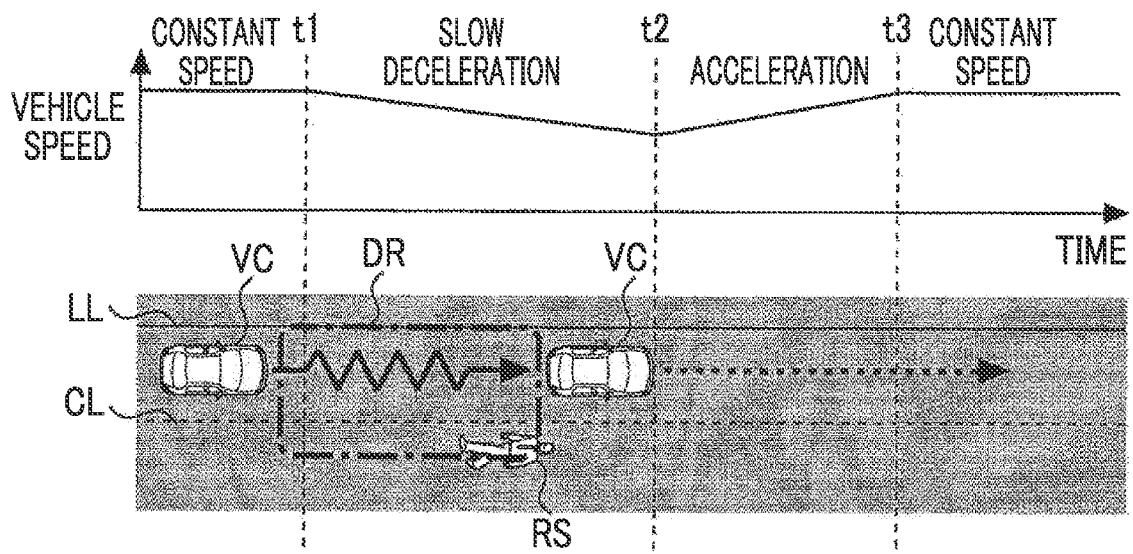
FIG. 2 is a diagram illustrating an operation example of a host vehicle when deceleration support control is performed by interruption during execution of constant speed control.

FIG. 2 is a diagram illustrating an operation example of the host vehicle when the deceleration support control interrupts the constant speed control under execution. In the example illustrated in FIG. 2, a deceleration object RS is recognized in the detection range DR. The position of the deceleration object RS is in the opposing lane with the center line CL interposed therebetween, and the direction relative to the host vehicle VC is right. In the example illustrated in FIG. 2, it is assumed that it is determined that there is a low possibility of collision of the host vehicle VC with the deceleration object RS. It is also assumed that a target deceleration for passing the deceleration object RS in a decelerated state is set instead of stopping the host vehicle VC before the deceleration object RS.

Here, when the non-operating mode has been selected (that is, when the constant speed control or the inter-vehicle distance control is not performed) and the starting time $t_1$ of the deceleration support control is too early, the operation of the automatic brake interferes with the driver's operation of the brake pedal. For example, even when the driver notices presence of the deceleration object RS and attempts to operate the brake pedal when the deceleration object RS and the host vehicle VC approach each other, the automatic brake may operate earlier than the operation of the brake pedal. In this case, there is concern that the driver will feel discomfort. In order to avoid this inconvenience, the support control determining unit 14 sets a time at which the host vehicle VC is predicted to approach the deceleration object RS as the starting time $t_1$ when the non-operating mode has been selected. When the operating mode has been selected, similarly, the support control determining unit 14 sets such a time as the starting time $t_1$.

The support control determining unit 14 sets a time at which the host vehicle VC is predicted to fully pass the deceleration object RS as the ending time $t_2$ of the deceleration support control. The time at which the host vehicle is predicted to fully pass the deceleration object RS is calculated by adding an execution time TA of the deceleration support control to the starting time t1. The execution time TA can be expressed by Equation (5) using a distance $L_2$ between the deceleration object RS and the host vehicle VC at the starting time of the deceleration support control, the longitudinal width WRS of the deceleration object RS, and the relative speed $Vr_2$ with respect to the deceleration object RS.

$$TA = (L_2 + WRS)/Vr_2 \quad (5)$$

Change of the vehicle speed when the deceleration support control interrupts the constant speed control is illustrated in an upper part of FIG. 2. Before the starting time $t_1$, the constant speed control is executed and the vehicle speed is maintained constant. After the starting time $t_1$, the deceleration support control is preferentially executed and thus the vehicle speed decreases slowly. After the ending time $t_2$, the vehicle speed increases with restarting of the constant speed control. After the time $t_3$, the vehicle speed is recovered to the same vehicle speed as before the starting time $t_1$.

Determination of a three-dimensional object by the three-dimensional object detecting unit 12 and determination of a possibility of collision by the deceleration object recognizing unit 13 are performed at each predetermined calculation cycle. Accordingly, when a new deceleration object is recognized from the starting time to the ending time of the deceleration support control, the support control determining unit 14 sets a starting time and/or an ending time of new deceleration support control for avoiding collision with the new deceleration object. Conversely, when a new deceleration object is not recognized during execution of the deceleration support control, the deceleration support control ends as scheduled.

Figure 3:
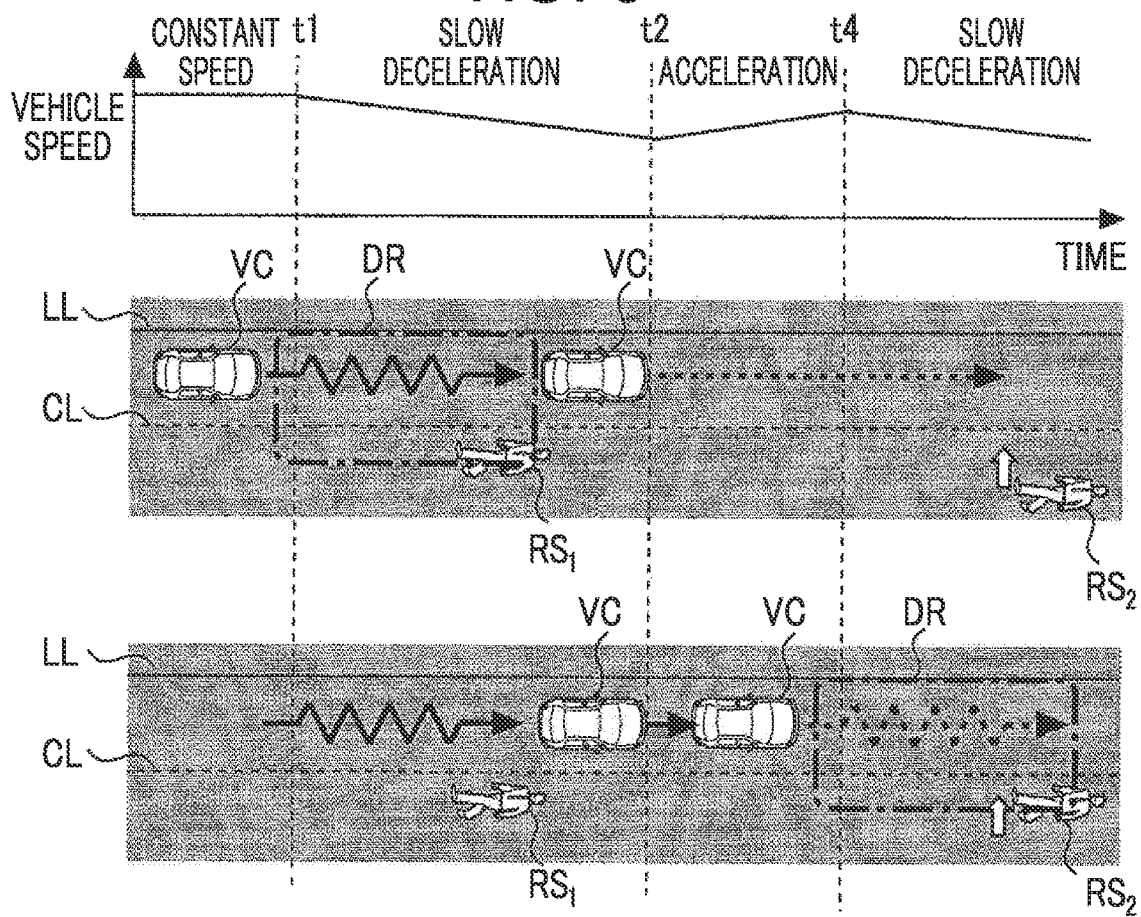
FIG. 3 is a diagram illustrating an operation example of the host vehicle when a new deceleration object has been recognized after the deceleration support control illustrated in FIG. 2 has been completed.

When a new deceleration object is recognized after the deceleration support control ends, the support control determining unit 14 sets a starting time and/or an ending time of new deceleration support control for avoiding collision with the new deceleration object. FIG. 3 is a diagram illustrating an operation example of the host vehicle when a new deceleration object is recognized after the deceleration support control described above with reference to FIG. 2 has ended. In the example illustrated in FIG. 3, deceleration support control for avoiding collision with a deceleration object $RS_1$ is executed by interrupting the constant speed control. In the example illustrated in FIG. 3, a new deceleration object $RS_2$ is recognized in the detection range DR after the deceleration support control has ended. The position of the deceleration object $RS_2$ is in the opposing lane with the center line CL interposed therebetween and the direction thereof relative to the host vehicle VC is right.

In the example illustrated in FIG. 3, it is assumed that it is determined that there is a low possibility of collision of the host vehicle VC with the deceleration object $RS_2$. It is also assumed that a target deceleration for passing the deceleration object $RS_2$ in a decelerated state is set instead of stopping the host vehicle VC before the deceleration object $RS_2$. Then, next deceleration support control for avoiding collision with the deceleration object $RS_2$ is started with no margin from ending of the current deceleration support control for avoiding collision with the deceleration object $RS_1$.

A time at which the host vehicle VC is predicted to approach the deceleration object $RS_2$ is set as a starting time $t_4$ of the next deceleration support control. It is assumed that an interval from the ending time $t_2$ to the starting time $t_4$ is short. Then, a sequence of vehicle operations including a decelerating operation accompanying the current deceleration support control after the starting time $t_1$, an accelerating operation accompanying restart of the constant speed control after the ending time $t_2$, and a decelerating operation accompanying the next deceleration support control after the starting time $t_4$ provides a complicated feeling to the driver.

Since the deceleration object $RS_2$ is barely recognized after the ending time $t_2$, another problem is caused when the driver notices presence of the deceleration object $RS_2$ before the ending time $t_2$. That is, the driver may feel discomfort that an accelerating operation is started after the ending time t2 because the host vehicle VC cannot identify the deceleration object $RS_2$.

Figure 4:
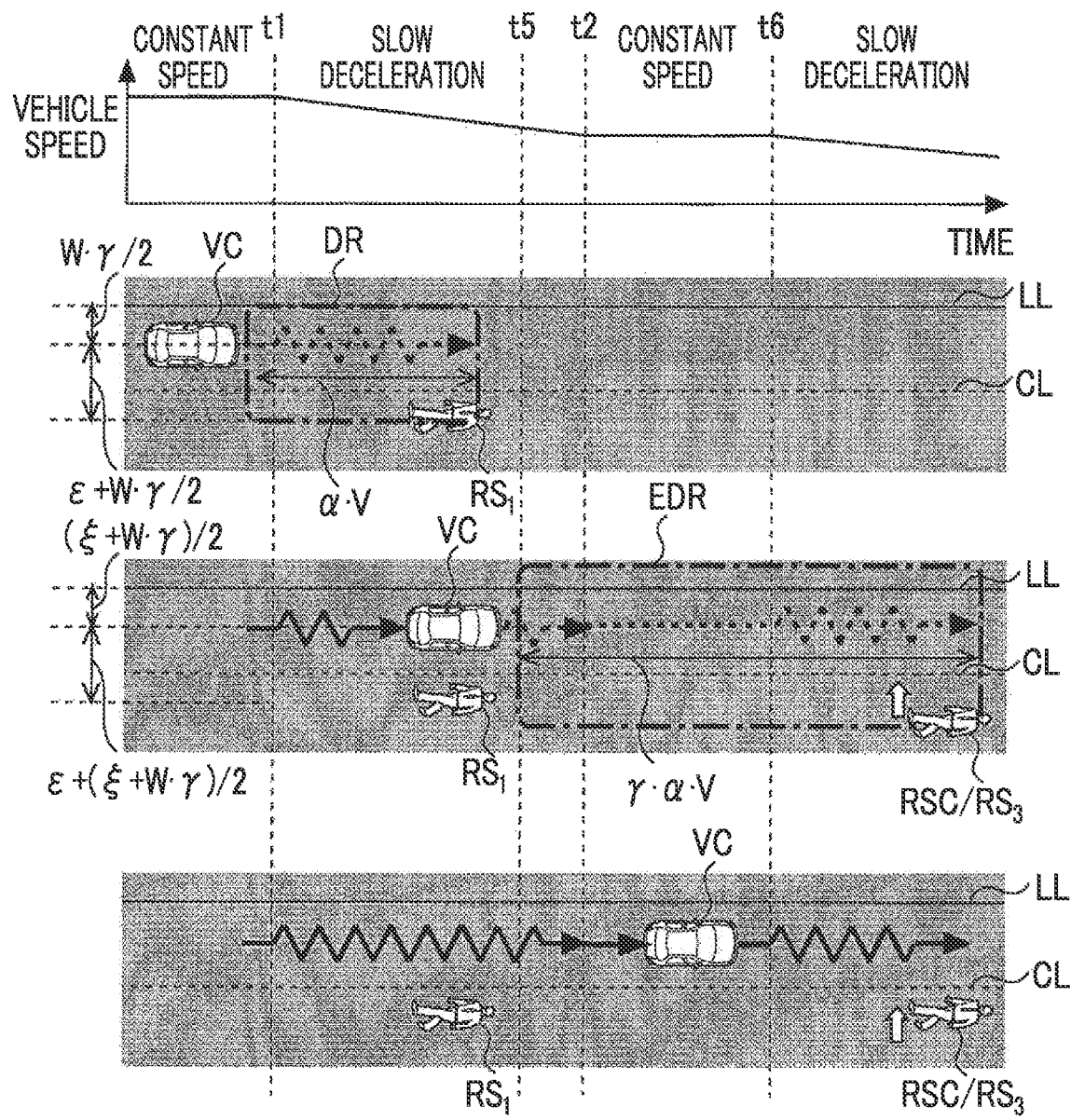
FIG. 4 is a diagram illustrating an example of support control according to the embodiment of the disclosure.

In consideration of such a problem, in this embodiment, when the deceleration support control is executed to by interrupting the constant speed control or the inter-vehicle distance control and a braking force for passing the deceleration object is generated in the host vehicle, the detection range which is set by the detection range setting unit 16 is enlarged from the starting time of the deceleration support control to the ending time thereof. FIG. 4 is a diagram illustrating an example of support control according to the embodiment of the disclosure. In the example illustrated in FIG. 4, similarly to the example illustrated in FIG. 3, the deceleration support control for avoiding collision with the deceleration object $RS_1$ is executed by interrupting the constant speed control.

In the example illustrated in FIG. 4, the detection range DR is enlarged to the front side and the lateral sides of the host vehicle VC along the current traveling lane. The longitudinal width of the enlarged detection range EDR is set to, for example, a value $\delta \cdot \alpha \cdot V$ obtained by multiplying the value of the longitudinal width before enlargement by a coefficient $\delta$. The lateral width of the enlarged detection range EDR is set to, for example, a value $\zeta + \varepsilon + W \cdot \gamma$ obtained by adding an enlarged width $\zeta$ in the lateral direction to the value $\varepsilon + W \cdot \gamma$ of the lateral width before enlargement. The coefficient $\delta$ is greater than 1.

In the example illustrated in FIG. 4, a candidate for a new deceleration object RSC is detected in the detection range EDR. Accordingly, the driving support ECU 10 performs the same process as when the deceleration object $RS_1$ is recognized on the candidate RSC. The process on the candidate RSC is performed based on scheduled positions of the candidate RSC and the host vehicle VC at the ending time of the deceleration support control (that is, the ending time $t_2$) and the relative speed with respect to the candidate RSC at the ending time when the deceleration support control for avoiding collision with the deceleration object $RS_1$ is executed as scheduled, instead of the positions of the candidate RSC and the host vehicle VC at a time $t_5$ at which the candidate RSC is detected.

Specifically, the deceleration object recognizing unit 13 predictively determines a possibility of collision of the host vehicle VC with the candidate RSC based on the ending time $t_2$. First, the deceleration object recognizing unit 13 calculates the predicted collision time TTC until the host vehicle VC collides with the candidate RSC using Equation (1). The distance $L_1$ in Equation (1) is replaced with a distance between the candidate RSC and the host vehicle VC at the ending time $t_2$. The relative speed $Vr_1$ in Equation (1) is replaced with the relative speed with respect to the candidate RSC at the ending time $t_2$. Subsequently, the deceleration object recognizing unit 13 determines whether the candidate RSC corresponds to a new deceleration object by comparing the calculated predicted collision time TTC with the collision determination values $TTC_1$ and $TTC_2$.

In the example illustrated in FIG. 4, it is assumed that the candidate RSC has been recognized as a new deceleration object $RS_3$. In this case, the support control determining unit 14 sets a starting time and/or an ending time of next deceleration support control for avoiding collision with the deceleration object $RS_3$ similarly to the case in which the deceleration object $RS_1$ is recognized. The position of the deceleration object $RS_3$ is in the opposing lane with the center line CL interposed therebetween, and the direction of the deceleration object $RS_3$ relative to the host vehicle VC is the same direction (right) as the relative direction with respect to the deceleration object $RS_1$. In the example illustrated in FIG. 4, it is assumed that it is determined that there is a low possibility of collision of the host vehicle VC with the deceleration object $RS_3$. It is also assumed that a target deceleration for passing the deceleration object $RS_3$ in a decelerated state is set instead of stopping the host vehicle VC before the deceleration object $RS_3$.

A time at which the host vehicle VC is predicted to approach the deceleration object $RS_3$ is set as a starting time $t_6$ of the next deceleration support control. It is assumed that an interval from the ending time $t_2$ to the starting time $t_6$ is short. Then, the same problem as the problem described with reference to FIG. 3 is caused. Therefore, the support control determining unit 14 sets a starting time and an ending time of control (hereinafter also referred to as "intermediate support control") which interrupts the constant speed control from the ending time $t_2$ to the starting time $t_6$. The starting time of the intermediate support control is a time matching the ending time $t_2$. The ending time of the intermediate support control is a time matching the starting time $t_6$.

When the starting time and the ending time of the intermediate support control have been set, the support control unit 15 sets a target acceleration which can maintain the vehicle speed at the ending time $t_2$ during execution of the intermediate support control. The support control unit 15 sets the target acceleration based on the vehicle speed at the ending time $t_2$ and the road surface gradient. The support control unit 15 transmits a driving command indicating the set target acceleration to the engine ECU 20.

Change of the vehicle speed when the intermediate support control interrupts the constant speed control is illustrated in an upper part of FIG. 4. The change of the vehicle speed until the ending time $t_2$ is the same as described above with reference to FIG. 2. In the example illustrated in FIG. 4, since the intermediate support control is executed from the ending time $t_2$ to the starting time $t_6$, the previous vehicle speed is maintained at the vehicle speed at the ending time $t_2$. After the starting time $t_6$, since the deceleration support control is preferentially executed, the vehicle speed decreases slowly.

Figure 5:
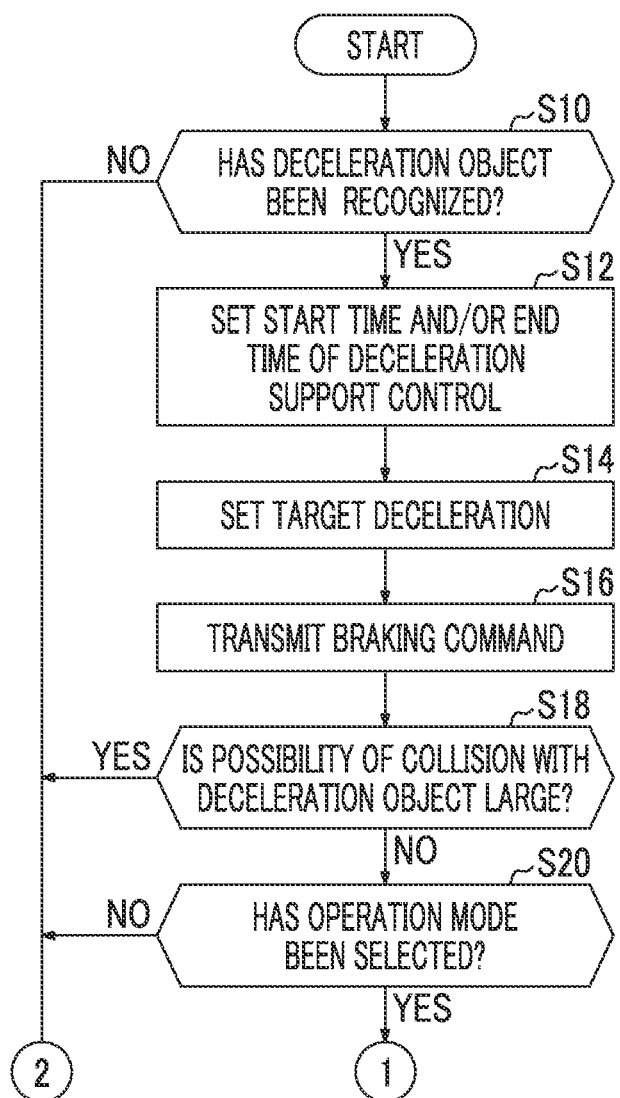
FIG. 5 is a diagram illustrating an example of a support control processing routine which is performed by a driving support ECU according to the embodiment of the disclosure.
Figure 6:
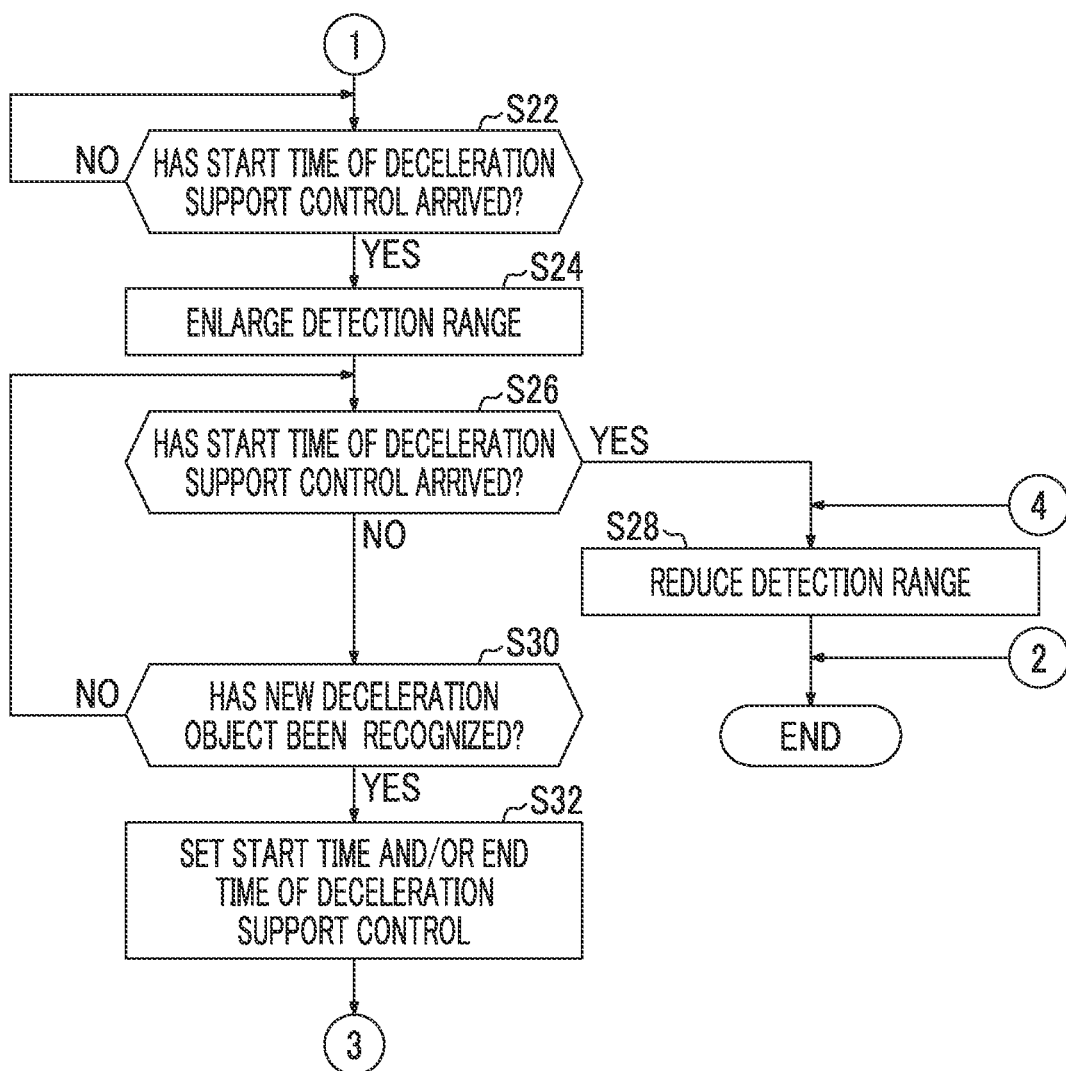
FIG. 6 is a diagram illustrating an example of a support control processing routine which is performed by the driving support ECU according to the embodiment of the disclosure.
Figure 7:
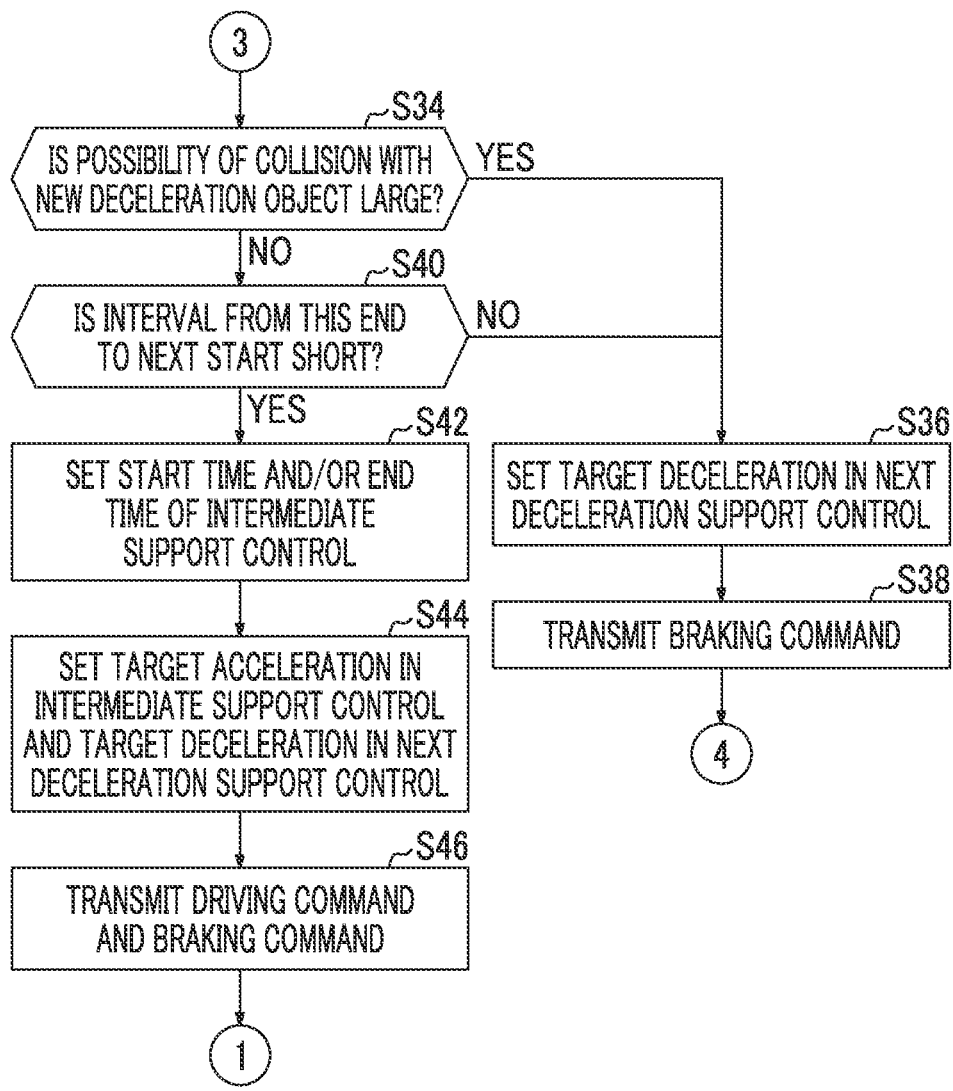
FIG. 7 is a diagram illustrating an example of a support control processing routine which is performed by the driving support ECU according to the embodiment of the disclosure.

FIGS. 5 to 7 are diagrams illustrating an example of a support control processing routine which is performed by the driving support ECU 10 according to the embodiment of the disclosure. This processing routine is repeatedly performed at each calculation cycle in a period in which an ignition switch is in an ON state.

When the processing routine illustrated in FIGS. 5 to 7 is started, the driving support ECU 10 first determines whether a deceleration object has been recognized (Step S10). The process of recognizing a deceleration object is the same as described above in description of the deceleration object recognizing unit 13. When it is determined that a deceleration object has not been recognized, the driving support ECU 10 ends this processing routine.

When it is determined in Step S10 that a deceleration object has been recognized, the driving support ECU 10 sets a starting time and/or an ending time of deceleration support control (Step S12). The process of setting the starting time and the like of the deceleration support control is the same as described in description of the support control determining unit 14.

Subsequent to Step S12, the driving support ECU 10 sets a target deceleration (Step S14). The process of setting a target deceleration is the same as described in description of the support control unit 15. Then, the driving support ECU 10 transmits a braking command to the brake ECU 30 (Step S16) such that the deceleration support control is started from the starting time set in Step S12.

Subsequent to Step S16, the driving support ECU 10 determines whether a possibility of collision with the deceleration object is high (Step S18). Whether the possibility of collision with the deceleration object is high is determined depending on whether the predicted collision time TTC is equal to or less than the collision determination value $TTC_1$. As a result, when it is determined that the possibility of collision with the deceleration object is high, the current deceleration support control can be determined to be control for stopping the host vehicle before the deceleration object. Accordingly, the driving support ECU 10 ends this processing routine.

When it is determined in Step S18 that the possibility of collision with the deceleration object is not high, the driving support ECU 10 determines whether the operating mode has been selected (Step S20). When it is determined that the operating mode has not been selected, it can be determined that the inter-vehicle distance control or the constant speed control is not restarted after the deceleration support control has ended. Accordingly, the driving support ECU 10 ends this processing routine.

When it is determined in Step S20 that the operating mode has been selected, the driving support ECU 10 determines whether the starting time of the deceleration support control has arrived (Step S22). The determination process of Step S22 is repeatedly performed until the determination result is positive. When the determination result is positive, that is, when it is determined that the starting time of the deceleration support control has arrived, the driving support ECU 10 enlarges the detection range (Step S24). The process of enlarging the detection range is the same as described above with reference to FIG. 4.

Subsequent to Step S24, the driving support ECU 10 determines whether the ending time of the deceleration support control has arrived (Step S26). That is, the driving support ECU 10 determines whether the deceleration support control is being executed. When it is determined that the ending time of the deceleration support control has arrived, the driving support ECU 10 reduces the detection range (Step S28). That is, the driving support ECU 10 returns the detection range enlarged in Step S24 to the original size.

When it is determined in Step S26 that the ending time of the deceleration support control has not arrived, the driving support ECU 10 determines whether a new deceleration object has been recognized (Step S30). The process of recognizing a new deceleration object is the same as described above with reference to FIG. 4. When it is determined that a new deceleration object has not been recognized, the driving support ECU 10 returns to the determination process of Step S26.

When it is determined in Step S30 that a new deceleration object has been recognized, the driving support ECU 10 sets a starting time and/or an ending time of next deceleration support control (Step S32). The process of setting the starting time and the like of the next deceleration support control is the same as described above with reference to FIG. 4.

Subsequent to Step S32, the driving support ECU 10 determines whether a possibility of collision with the new deceleration object is high (Step S34). Whether the possibility of collision with the new deceleration object is high is determined depending on whether the predicted collision time TTC is equal to or less than the collision determination value $TTC_1$. As a result, when it is determined that the possibility of collision with the new deceleration object is high, the next deceleration support control can be determined to be control for stopping the host vehicle before the new deceleration object. Accordingly, the driving support ECU 10 sets a target deceleration (Step S36). The process of setting a target deceleration is the same as described in description of the support control unit 15.

Subsequent to Step S36, the driving support ECU 10 transmits a braking command to the brake ECU 30 (Step S38) such that the deceleration support control is started at the starting time set in Step S32. Then, the driving support ECU 10 reduces the detection range (Step S28).

When it is determined in Step S34 that the possibility of collision with the new deceleration object is not high, the driving support ECU 10 determines whether an interval from the ending time of the current deceleration support control to the starting time of the next deceleration support control is less than a threshold value (Step S40). The threshold value is set depending on the vehicle speed at the ending time of the current deceleration support control. When it is determined that the interval is equal to or greater than the threshold value, it can be determined that the interval from the ending time of the current deceleration support control to the starting time of the next deceleration support control is long and there is no problem in restarting the vehicle speed control or the like. Accordingly, the driving support ECU 10 performs the processes of Step S36 and the steps subsequent thereto.

When it is determined in Step S40 that the interval is less than the threshold value, the driving support ECU 10 transmits a starting time and an ending time of intermediate support control to the brake ECU 30 (Step S42). The starting time and the ending time of the intermediate support control are the same as described above with reference to FIG. 4.

Subsequent to Step S42, the driving support ECU 10 sets a target acceleration in the intermediate support control set in Step S42 and a target deceleration in the next deceleration support control (Step S44). These setting processes are the same as described above with reference to FIG. 4.

Subsequent to Step S44, the driving support ECU 10 transmits a driving command to the engine ECU 20 (Step S46) such that the vehicle speed at the ending time of the current deceleration support control is maintained from the starting time to the ending time, which are set in Step S42. The driving support ECU 10 also transmits a braking command to the brake ECU 30 such that the next deceleration support control is started at the starting time set in Step S32 and is ended at the ending time set at the same step.

With the above-mentioned vehicle control device according to the embodiment, the following advantages can be achieved. That is, when deceleration support control is executed by interrupting constant speed control or inter-vehicle distance control and the deceleration support control is control for causing a host vehicle to pass a deceleration object, the detection range during execution of the deceleration support control is enlarged to the front side and the right and left sides of the host vehicle. Accordingly, it is possible to increase opportunities to recognize a new deceleration object during execution of the deceleration support control.

When a new deceleration object has been recognized during enlargement of the detection range, next deceleration support control for avoiding collision with the new deceleration object is control for causing the host vehicle to pass the new deceleration object, and an interval from the ending time of the current deceleration support control to the starting time of the next deceleration support control is short, intermediate support control is executed. Accordingly, it is possible to avoid a situation in which an accelerating operation accompanying restarting of the constant speed control or the inter-vehicle distance control is performed.

In the above-mentioned embodiment, the vehicle control device is based on the premise that the host vehicle includes an engine. However, the vehicle control device according to the disclosure may be applied to a hybrid vehicle including a motor in addition to the engine and may be applied to an electric vehicle including a motor instead of the engine. When the motor is provided, a motor ECU that receives a driving command from the driving support ECU can be separately provided, and an inverter as a motor driver can be controlled by the motor ECU such that the motor is driven.

In the above-mentioned embodiment, the lateral width of the detection range is enlarged by a margin ε to the opposing lane side. However, the margin ε may be provided to the road shoulder with the left white line LL interposed therebetween, or the margin ε may not be provided.

In the above-mentioned embodiment, when an interval from the ending time of the current deceleration support control to the starting time of the next deceleration support control is short, the intermediate support control is executed. That is, restarting of the constant speed control or the inter-vehicle distance control is postponed and the intermediate support control is executed. However, restarting of the constant speed control or the inter-vehicle distance control may not be postponed. This modified example will be described below with reference to FIGS. 8 and 9.

Figure 8:
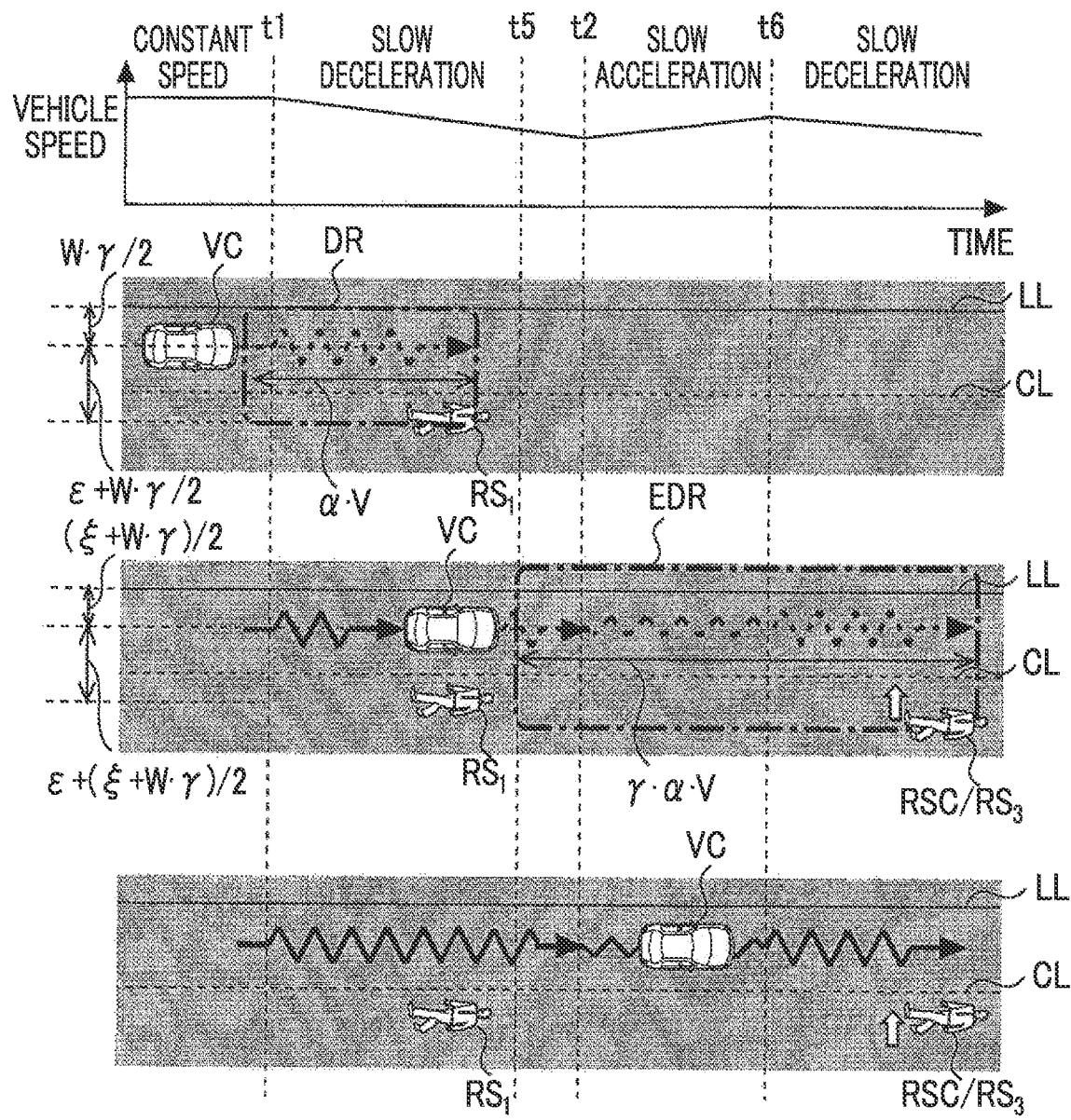
FIG. 8 is a diagram illustrating an example of support control according to a modified example of the embodiment of the disclosure.

FIG. 8 is a diagram illustrating support control according to a modified example of the embodiment of the disclosure. The preconditions of the example illustrated in FIG. 8 are the same as the preconditions of the example illustrated in FIG. 4. In the example illustrated in FIG. 8, the support control determining unit 14 sets an upper limit value of a target acceleration of the host vehicle VC which is set in the restarted constant speed control. When the upper limit value is set, the acceleration in the restarted constant speed control is lower than the original acceleration. Accordingly, even when the accelerating operation is performed with the constant speed control restarted in the decelerating operation, it is possible to reduce discomfort which will be felt by a driver.

Figure 9:
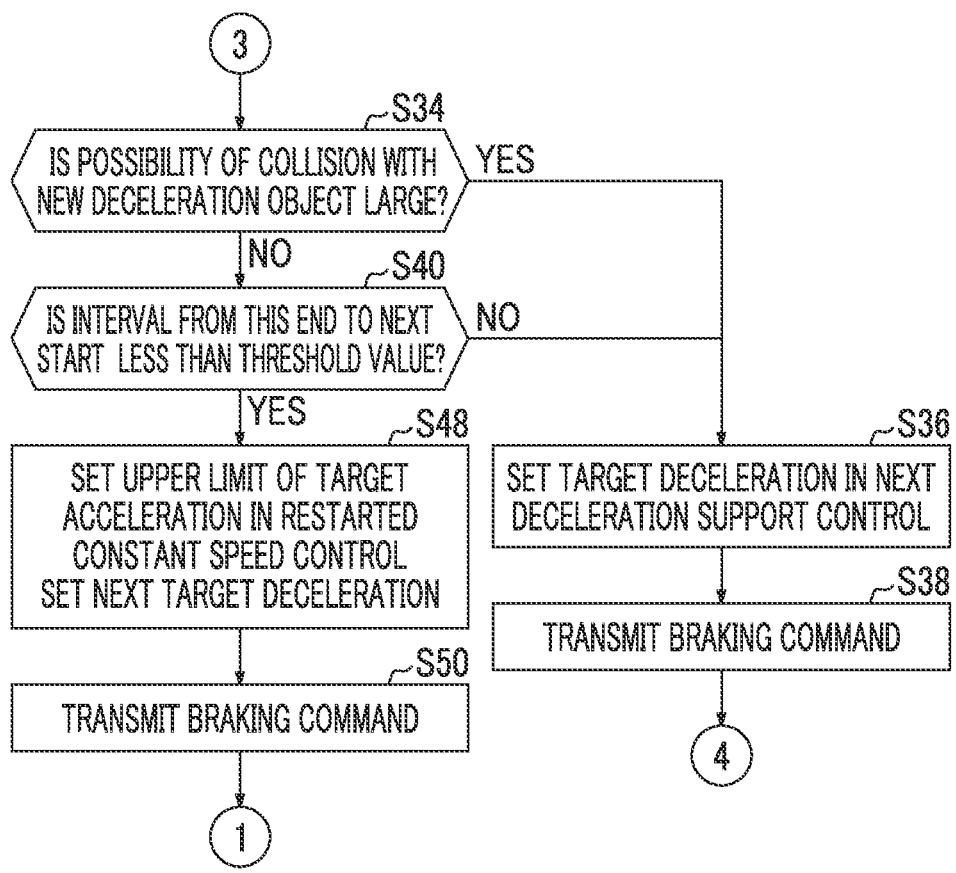
FIG. 9 is a diagram illustrating an example of a processing routine which is performed by a driving support ECU to realize the support control according to the modified example of the embodiment of the disclosure illustrated in FIG. 8.

FIG. 9 is a diagram illustrating an example of a processing routine which is performed by the driving support ECU 10 to realize the support control according to the modified example of the embodiment of the disclosure described with reference to FIG. 8. When the processing routine illustrated in FIG. 7 is replaced with the processing routine illustrated in FIG. 9, the support control processing routine according to the modified example is described. The processing routine illustrated in FIG. 9 is different from the processing routine illustrated in FIG. 7 in that the process when the determination result of Step S40 is positive.

That is, when the determination result is positive, the driving support ECU 10 sets the upper limit value of the target acceleration in the restarted constant speed control and the target deceleration in the next deceleration support control (Step S48). These setting processes are the same as described above with reference to FIG. 8. Then, the driving support ECU 10 transmits a braking command to the brake ECU 30 (Step S50) such that the next deceleration support control is started at the starting time set in Step S32 and is ended at the ending time set in the same step.

In this way, when it is predicted that the same next deceleration support control as the current deceleration support control can be started immediately after the current deceleration support control has been ended, the above-mentioned embodiment can be modified in various forms as long as acceleration support control based on a target acceleration lower than the target acceleration set when the inter-vehicle distance control or the constant speed control is restarted is performed as support control which is performed from the ending time of the current deceleration support control to the starting time of the next deceleration support control.

What is claimed is:

1. A vehicle control device configured to execute deceleration support control during execution of inter-vehicle distance control or constant speed control, the vehicle control device comprising:
an electronic control unit (ECU) configured to:
during execution of the deceleration support control, determine whether an object with a possibility of collision with a host vehicle has been detected;
when the electronic control unit determines that the object has been detected, determine whether an interval from an ending time of the deceleration support control to a starting time of a next deceleration support control is less than a threshold value; and when the electronic control unit determines that the interval is less than the threshold value, perform one of a first intermediate control and a second intermediate control, the first intermediate control being control which maintains a vehicle speed at the ending time of the deceleration support control, and the second intermediate control being control which restarts the inter-vehicle distance control or the constant speed control.

2. The vehicle control device according to claim 1, wherein the ECU is further configured to, when the inter-vehicle distance control or the constant speed control is restarted after execution of deceleration support control, set a target acceleration such that the vehicle speed at the ending time of the deceleration support control is changed to become equal to a vehicle speed before the execution of the deceleration support control, wherein a second target acceleration is smaller than a first target acceleration, wherein the first target acceleration is a target acceleration which is set when the inter-vehicle distance control or the constant speed control is restarted in a case that the electronic control unit does not determine, during a current deceleration support control, to execute a next deceleration support control, wherein the second target acceleration is a target acceleration which is set when the inter-vehicle distance control or the constant speed control is restarted in the second intermediate control.

3. The vehicle control device according to claim 1, wherein the threshold value is a value which is set based on the vehicle speed at the ending time of the deceleration support control.

4. A control method for a vehicle configured to execute deceleration support control during execution of inter-vehicle distance control or constant speed control, using an electronic control unit (ECU), the control method comprising:

during execution of the deceleration support control, determining whether an object with a possibility of collision with a host vehicle has been detected;

when the object has been detected, determining whether an interval from an ending time of the deceleration support control to a starting time of a next deceleration support control is less than a threshold value; and when the interval is determined to be less than the threshold value, performing one of a first intermediate control and a second intermediate control, the first intermediate control being control which maintains a vehicle speed at the ending time of the deceleration support control, and the second intermediate control being control which restarts the inter-vehicle distance control or the constant speed control.

5. The control method according to claim 4, further comprising, when the inter-vehicle distance control or the constant speed control is restarted after execution of deceleration support control, setting a target acceleration such that the vehicle speed at the ending time of the deceleration support control is changed to become equal to a vehicle speed before the execution of the deceleration support control, wherein a second target acceleration is smaller than a first target acceleration, wherein the first target acceleration is a target acceleration which is set when the inter-vehicle distance control or the constant speed control is restarted in a case that, during a current deceleration support control, the determination is not to execute a next deceleration support control, wherein the second target acceleration is a target acceleration which is set when the inter-vehicle distance control or the constant speed control is restarted in the second intermediate control.

6. The control method according to claim 4, wherein the threshold value is a value which is set based on the vehicle speed at the ending time of the deceleration support control.

7. A non-transitory computer-readable medium storing a program that causes an electronic control unit (ECU) to execute deceleration support control during execution of inter-vehicle distance control or constant speed control, the deceleration support control comprising:

during execution of the deceleration support control, determining whether an object with a possibility of collision with a host vehicle has been detected;

when the object has been detected, determining whether an interval from an ending time of the deceleration support control to a starting time of a next deceleration support control is less than a threshold value; and when the interval is less than the threshold value, performing one of a first intermediate control and a second intermediate control, the first intermediate control being control which maintains a vehicle speed at the ending time of the deceleration support control, and the second intermediate control being control which restarts inter-vehicle distance control or the constant speed control.

8. The non-transitory computer readable medium according to claim 7, further comprising, when the inter-vehicle distance control or the constant speed control is restarted after execution of deceleration support control, setting a target acceleration such that the vehicle speed at the ending time of the deceleration support control is changed to become equal to a vehicle speed before the execution of the deceleration support control, wherein a second target acceleration is smaller than a first target acceleration, wherein the first target acceleration is a target acceleration which is set when the inter-vehicle distance control or the constant speed control is restarted in a case that, during a current deceleration support control, the determination is not to execute a next deceleration support control, wherein the second target acceleration is a target acceleration which is set when the inter-vehicle distance control or the constant speed control is restarted in the second intermediate control.

9. The non-transitory computer readable medium according to claim 7, wherein the threshold value is a value which is set based on the vehicle speed at the ending time of the deceleration support control.

* * * * *